United States Patent [19]

Kuwaoka

[11] Patent Number: 4,961,205
[45] Date of Patent: * Oct. 2, 1990

[54] INTERFACE CIRCUIT

[75] Inventor: Toshiharu Kuwaoka, Yokohama, Japan

[73] Assignee: Victor Company of Japan, Ltd., Japan

[*] Notice: The portion of the term of this patent subsequent to Jul. 11, 2006 has been disclaimed.

[21] Appl. No.: 247,437

[22] Filed: Sep. 6, 1988

Related U.S. Application Data

[63] Continuation-in-part of Ser. No. 61,314, Jun. 11, 1987, Pat. No. 4,847,873.

[30] Foreign Application Priority Data

Sep. 11, 1987 [JP] Japan .................. 62-227681

[51] Int. Cl.⁵ .............................................. H04B 3/00
[52] U.S. Cl. ...................................... 375/36; 375/106; 455/600
[58] Field of Search ................... 375/36, 99, 106, 3, 375/4, 3.1, 94, 118; 455/600, 601, 602, 606, 613; 250/551

[56] References Cited

U.S. PATENT DOCUMENTS

| | | | |
|---|---|---|---|
| 3,825,896 | 7/1974 | Obenhaus | 455/602 |
| 3,912,951 | 10/1975 | K'Hara | 455/602 |
| 4,211,920 | 7/1980 | Wakabayashi | 455/601 |
| 4,562,581 | 12/1985 | Tanaka et al. | 375/7 |
| 4,596,048 | 6/1986 | Dunki-Jacobs | 250/551 |
| 4,727,535 | 2/1988 | Brandt | 250/551 |
| 4,736,394 | 4/1988 | Giovannelli et al. | 375/36 |
| 4,750,216 | 6/1988 | Boyco | 455/602 |
| 4,757,279 | 7/1988 | Balzano | 375/120 |
| 4,847,873 | 7/1989 | Kuwaoka et al. | 375/36 |

Primary Examiner—Benedict V. Safourek
Assistant Examiner—Stephen Chin
Attorney, Agent, or Firm—Lowe, Price, LeBlanc, Becker & Shur

[57] ABSTRACT

A photo coupling device optically connects a transmission unit and a reception unit. The photo coupling device includes a photo emitter and a photo receptor connected via an optical path. The photo emitter is disposed in the transmission unit. The photo emitter is supplied with a transmission digital data signal and generates an optical signal corresponding to the transmission digital data signal. The photo receptor is disposed in the reception unit and receives the optical signal. The photo receptor is switched by short electrical pulses. The photo receptor samples the optical signal and converts the sampled optical signal into a corresponding digital signal at moments of occurrence of the short electrical pulses. A sync signal is transmitted from the transmission unit to the reception unit. The sync signal has a fixed timing relationship with the transmission digital data signal. The short electrical pulses are generated on the basis of the sync signal and are synchronized with the transmission digital data signal.

14 Claims, 8 Drawing Sheets

INTERFACE CIRCUIT

CROSS-REFERENCES TO RELATED APPLICATIONS

This is a continuation-in-part of application Ser. No. 061,314, filed June 11, 1987 U.S. Pat. No. 4,847,873.

BACKGROUND OF THE INVENTION

1. Field of the Invention

This invention generally relates to an interface circuit for digital signal transmission or communication between separate devices, and specifically relates to an interface circuit for digital audio or video signal transmission between separate devices in an audio system or a video system.

2. Description of the Prior Art

Advanced audio or video systems handle sound or display data in the form of digital signals at certain stages. In these systems, the digital data signals are finally converted into corresponding analog data signals. The deterioration in quality of such a reproduced analog data signal mainly results from the following two causes:

(1) A failure in accurate transmission and digital-to-analog (D/A) conversion of a digital data signal;

(2) Contamination of an analog data signal caused by the ingress of noises ripples and jitters to the circuitry which processes or carries the analog data signal, such noises ripples and jitters are contained in a digital data signal or are generated in a digital signal processing unit.

One known way of removing the previously-mentioned cause (2) of the signal deterioration is to dispose a digital signal processing unit and a D/A converting and analog signal processing unit respectively in separate chassis whereby interference between the two units are minimized. In some cases, these two units in the separate chassis are further housed in a common cabinet. In other cases, they are housed in separate cabinets respectively.

In digital audio systems, another known way of removing the previously-mentioned cause (2) of the signal deterioration is to use a photocoupler in an interface circuit performing digital signal transmission from a digital signal processing unit (a signal transmitting unit) to a D/A converting and analog signal processing unit (a signal receiving unit). In this interface circuit, a digital signal is transmitted between the two units via the photocoupler. The photocoupler enables the two units to remain electro-conductively isolated from each other while signal transmission between them are maintained. According to this electro-conductive isolation, the two units are generally activated by separate power supplies and grounds of the two units are separated also. The electro-conductive isolation is advantageous in that if a ground current of the signal transmitting unit is subject to change because of a change of load to the associated power supply, such variation in the ground current of the signal transmitting unit will not be transmitted to the signal receiving unit. Furthermore, the electro-conductive isolation including the ground isolation is usually effective in cutting off common mode noises.

However, such a known photocoupler-based interface circuit is incapable of removing the previously-mentioned cause (1) of the signal deterioration. Specifically, in this known interface circuit, once a digital sound signal contains unwanted components such as jitters, noises, or ripples in its waveform, the consequently reproduced analog sound signal will be deteriorated by these unwanted components. The deteriorated analog sound signal degrades tone quality and fidelity in sound reproduction.

SUMMARY OF THE INVENTION

It was found that removal of both the previously-mentioned causes (1) and (2) of the signal deterioration would assure the reproduced sound with excellent tone quality and fidelity in a digital audio system. This invention is based on this fact. It should be noted that this invention is not limited to application to a digital audio system. This invention can also be applied to digital systems such as a digital video system.

It is an object of this invention to provide an interface circuit which can remove unwanted components such as jitters, noises, or ripples from a transmitted digital signal to be transmitted from a unit to another.

It is a specific object of this invention to provide an interface circuit for a digital audio or video system which can remove the previously-mentioned cause (1) of the signal deterioration in addition to the previously-mentioned cause (2) of the signal deterioration and thereby to assure sound or image reproduction with excellent fidelity.

In an interface circuit of this invention, a photo coupling device optically connects a transmission unit and a reception unit. The photo coupling device includes a photo emitter and a photo receptor connected via an optical path. The photo emitter is disposed in the transmission unit. The photo emitter is supplied with a transmission digital data signal and generates an optical signal corresponding to the transmission digital data signal. The photo receptor is disposed in the reception unit and receives the optical signal. The photo receptor is switched by short electrical pulses so that the photo receptor samples the optical signal and converts the sampled optical signal into a corresponding digital signal at moments of occurrences of the short electrical pulses. A sync signal is transmitted from the transmission unit to the reception unit. The sync signal has a fixed timing relationship with the transmission digital data signal. The short electrical pulses are generated on the basis of the sync signal and are synchronized with the transmission digital data signal.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
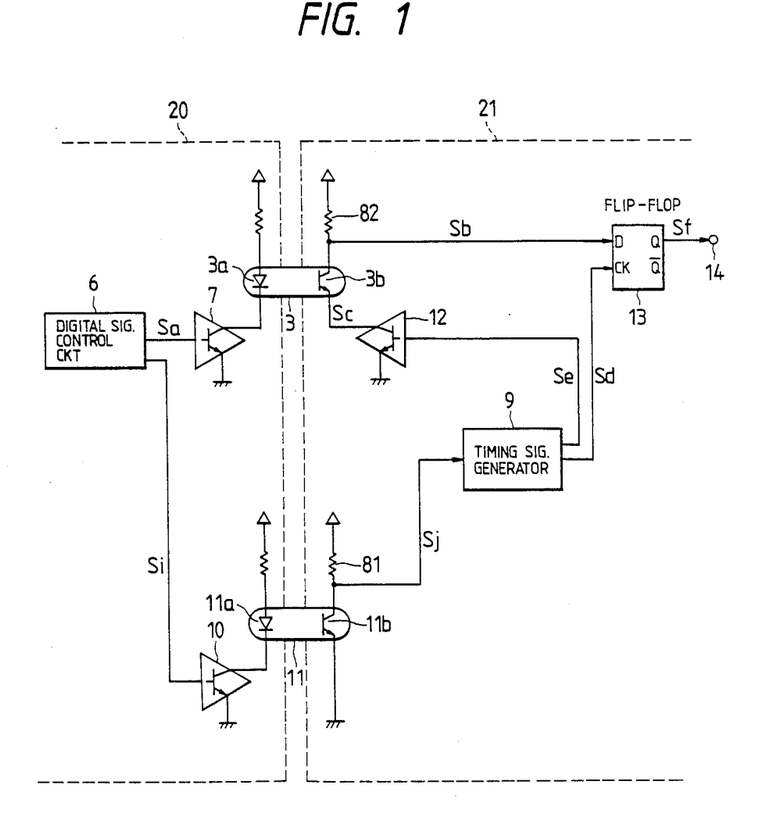
FIG. 1 is a diagram of an interface circuit according to a first embodiment of this invention.

With reference to FIG. 1 showing a first embodiment of this invention, a digital signal processing unit includes a signal transmission circuit 20. A digital-to-analog (D/A) converting and analog signal processing unit includes a signal reception circuit 21 optically connected to the transmission circuit 20 via photocouplers 3 and 11. The transmission circuit 20 outputs an optical data signal to the reception circuit 21 via the photocoupler 3. In addition, the transmission circuit 20 outputs an optical sync signal to the reception circuit 21 via the photocoupler 11.

The transmission circuit 20 and the reception circuit 21 are mutually electro-conductively isolated to remove the previously-mentioned cause (2) of the signal deterioration. Specifically, the transmission circuit 20 and the reception circuit 21 are individually activated by respective power supplies (not shown). Grounds of these circuits 20 and 21 are mutually separated. The transmission circuit 20 and the reception circuit 21 are preferably disposed in separate chassis respectively. In addition, these circuits 20 and 21 except their portions having the optical connections via the photocouplers 3 and 11 are preferably mutually separated by electrical shields (not shown).

The transmission circuit 20 includes a digital signal control circuit 6 outputting a digital or binary data signal Sa. A data output terminal of the digital signal control circuit 6 is connected to an input terminal of a driver 7 within the transmission circuit 20 so that the digital data signal Sa is applied to the driver 7. The driver 7 preferably includes a switching transistor which is made conductive and nonconductive in accordance with change of the digital data signal Sa between two different level states. One of such devices usable for the driver 7 is a Texas Instrument type SN7407 open collector TTL IC-chip. For example, the driver 7 is made conductive and nonconductive when the digital data signal Sa assumes a logic state "0" and a logic state "1" respectively. An output terminal of the driver 7 is connected to a constant voltage source (not shown) via a light-emitting diode (LED) 3a of the photocoupler 3 and a fixed resistor (no reference character). The LED 3a of the photocoupler 3 is included in the transmission circuit 20.

Figure 2:
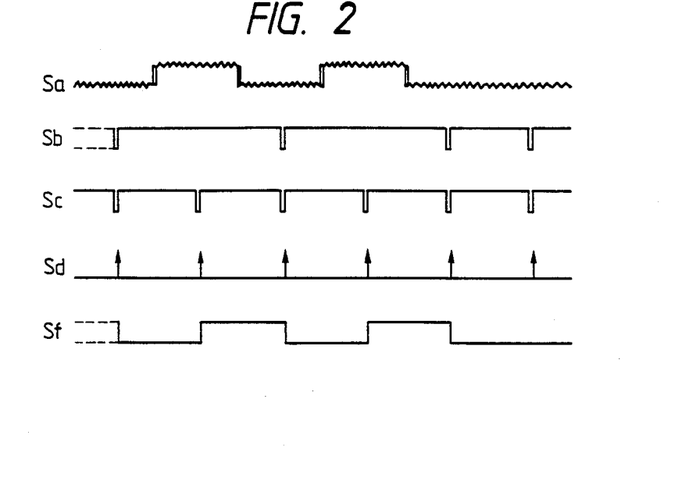
FIG. 2 is a timing diagram of waveforms of various signals developed in the interface circuit of FIG. 1.

When the digital data signal Sa assumes a first level state or a logic state "0", "LOW" as shown in FIG. 2 the driver 7 is made conductive so that a current from the voltage source flows through the LED 3a. This current activates the LED 3a so that the LED 3a emits light. When the digital data signal Sa assumes a second level state or a logic state "1" (HIGH), the driver 7 is made nonconductive so that the current flow through the LED 3a is interrupted. The interruption of the current flow through the LED 3a deactivates the LED 3a so that the light emission from the LED 3a is also interrupted. In this way, the LED 3a generates an optical binary signal which corresponds to the digital data signal Sa.

The digital signal control circuit 6, the driver 7, the LED 3a, the section for supplying current to the LED 3a, and the connections between them are shielded by suitable members (not shown) to protect the digital data signal Sa from interference by other signals and noises. This shield structure is to remove the previously-mentioned cause (2) of the signal deterioration.

As shown in FIG. 2, the digital data signal Sa tends to contain or being superimposed on unwanted components, such as high frequency noise components, ripples and jitter components of the waveform of the digital data signal Sa. These unwanted components are removed through signal processing described hereinafter.

The digital signal control circuit 6 also outputs a binary sync signal Si. A sync output terminal of the digital signal control circuit 6 is connected to an input terminal of a driver 10 so that the sync signal Si is applied to the driver 10. The driver 10 preferably includes a switching transistor which is made conductive and nonconductive in accordance with change of the sync signal Si between two different level states. For example, the driver 10 is made conductive and nonconductive when the sync signal Si assumes a logic state "1" (negative going pulse) and a logic state "0" respectively. An output terminal of the driver 10 is connected to the constant voltage source (not shown) via a light-emitting diode (LED) 11a of the photocoupler 11 and a fixed resistor (no reference character).

When the sync signal Si assumes a logic state "1", the driver 10 is made conductive so that a current from the voltage source flows through the LED 11a. This current activates the LED 11a so that the LED 11a emits light. When the sync signal Si assumes a logic state "0", the driver 10 is made nonconductive so that the current flow through the LED 11a is interrupted. The interruption of the current flow through the LED 11a deactivates the LED 11a so that the light emission from the LED 11a is also interrupted. In this way, the LED 11a generates an optical binary signal which corresponds to the sync signal Si.

Figure 3:
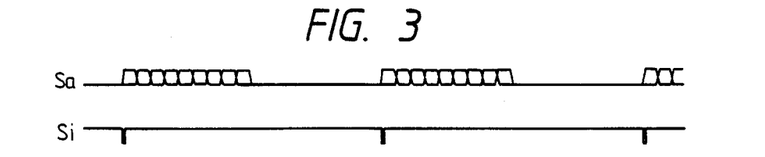
FIG. 3 is a timing diagram of a transmission digital data signal and a sync signal in the interface circuit of FIG. 1.

As shown in FIG. 3, the sync signal Si is a train of negative going pulses each having a short pulse duration. Outputting of each data series in the digital data signal Sa is started at a timing essentially concurrent with or immediately after a timing of the occurrence (logic "1") of each sync pulse Si.

The reception circuit 21 includes a phototransistor 11b of the photocoupler 11. When the associated LED 11a emits light, the phototransistor 11b is made conductive. When the light emission from the LED 11a is interrupted, the phototransistor 11b becomes nonconductive. Thus, the phototransistor 11b is made conductive and nonconductive in accordance with the sync signal Si. The phototransistor 11b is connected to a constant voltage source (not shown) via a fixed resistor 81. When the phototransistor 11b is conductive and nonconductive, a potential at the junction between the phototransistor 11b and the fixed resistor 81 goes low and high respectively. Accordingly, the potential at the junction between the phototransistor 11b and the fixed resistor 81 shows a transmitted sync signal Sj which corresponds to the original sync signal Si. In this way, the sync signal Si is transmitted from the transmission circuit 20 to the reception circuit 21.

The junction between the phototransistor 11b and the fixed resistor 81 is connected to an input terminal of a timing control signal generator 9 within the reception circuit 21 so that the sync signal Sj is applied to the timing control signal generator 9. The timing control signal generator 9 outputs a read clock signal Sd and a binary driver control signal Se on the basis of the sync signal Sj.

The reception circuit 21 includes a driver 12. An input terminal of the driver 12 is connected to an output terminal of the timing control signal generator 9 so that the driver 12 receives the binary control signal Se. The driver 12 preferably includes a switching transistor which is made conductive and nonconductive in accordance with change of the binary control signal Se between two different level states. For example, the driver 12 is made conductive and nonconductive when the control signal Se assumes a logic state "0" (positive going pulse) and a logic state "1" respectively. An output terminal of the driver 12 is connected to the constant voltage source (not shown) via a phototransistor 3b of the photocoupler 3 and a fixed resistor 82. The phototransistor 3b of the photocoupler 3 is included in the reception circuit 21.

When the driver 12 is conductive and nonconductive, a potential Sc at the junction between the driver 12 and the phototransistor 3b goes low and high respectively. Accordingly, the potential Sc at the junction between the driver 12 and the phototransistor 3b reflects the state of the driver 12 and thus depends on the control signal Se. In other words, the driver 12 transmits the control signal Se to the phototransistor 3b in the form of a signal Sc. Specifically, as shown in FIG. 2, the phototransistor control signal Sc containing negative or inverted short pulses, is so generated to have a fixed timing relationship with the digital data signal Sa. While the driver 12 is conductive, a phototransistor control pulse Sc presents. While the driver 12 is nonconductive, a phototransistor control pulse Sc is absent. Previously mentioned device type SN7407 from Texas Instrument may be used for the drivers 10 and 12.

The phototransistor 3b is made conductive when the associated LED 3a emits light and the control pulse Sc is present. The phototransistor 3b becomes nonconductive when the light emission from the LED 3a is interrupted or when the control pulse Sc is absent. Thus, the phototransistor 3b is made conductive and nonconductive in accordance with the digital data signal Sa and the control pulse Sc. As shown in FIG. 2, provided that the driver 12 is conductive, that is, a phototransistor control pulse Sc is present, a potential Sb at the junction between the phototransistor 3b and the fixed resistor 82 goes low and high when the phototransistor 3b is conductive and nonconductive respectively. Accordingly, provided that a phototransistor control pulse Sc is present, the potential Sb at the junction between the phototransistor 3b and the fixed resistor 82 reflects the digital data signal Sa. In other words, provided that a phototransistor control pulse Sc is present, the digital data signal Sa from the transmission circuit 20 is allowed to transfer to the reception circuit 21 in the form of a signal Sb. As shown in FIG. 2, provided that the driver 12 is nonconductive, that is, a phototransistor control pulse Sc is absent, the potential Sb between the phototransistor 3b and the fixed resistor 82 remains at a high level irrespective of the digital data signal Sa. In this way, the digital data signal Sa is sampled with timings and durations determined by the phototransistor control pulses Sc and is thereby transfered into a processed data signal Sb.

As understood from the previous description, a transmitted digital data signal corresponding to the digital data signal Sa is sampled during short durations and is thereby transfered into the processed data signal Sb so that unwanted noise components which occur during periods outside the short durations are removed from the processed data signal Sb. Accordingly, unwanted noise and ripple components are substantially removed from the processed data signal Sb as shown in FIG. 2. Since the sampling process is performed as if a gate is provided at a front end of the reception circuit 21 together with the photocoupler 3, unwanted noise and ripple components in the digital data signal Sa are prevented from invading or being induced into subsequent stages of the reception circuit 21 through neither a main data signal path nor its return path i.e. the ground line. This is advantageous because of the following fact. Once such unwanted components mentioned before have invaded or been induced into the structure of the reception circuit 21, the ground line or the signal return path in particular, the removeal of such components would be generally difficult.

The timings and durations of sampling of the digital data signal Sa, that is, the timings and pulse durations of the phototransistor control pulses Sc, are chosen to reside outside the periods during which jitter components of the digital data signal Sa may exist as shown in FIG. 2. This timing and duration setting reliably removes jitter components from the processed data signal Sb.

The junction between the phototransistor 3b and the fixed resistor 82 is connected to a data input terminal of a D flip-flop 13 so that the processed data signal Sb is applied to the data input terminal of the D flip-flop 13. A clock pulse input terminal of the D flip-flop 13 is connected to the timing control signal generator 9 so as to receive the read clock signal Sd. A non-inverting output terminal of the D flip-flop 13 is connected to a connection point or terminal 14 so that an output signal Sf from the D flip-flop 13 is applied to the connection point 14.

As shown in FIG. 2, the read clock signal Sd contains short pulses synchronous with the phototransistor control pulses Sc. In addition, the read clock pulses Sd occur at moments within the respective pulse durations of the corresponding phototransistor control pulses Sc. Accordingly, the read clock pulses Sd occur at moments within the respective periods during which the processed data signal Sb represents accurate values. At moments of the occurrences of the read clock pulses Sd, the logic state of the flip-flop output signal Sf agree with the logic state of the processed data signal Sb. From the moment of the occurrence of a read clock pulse Sd, the logical state of the flip-flop output signal Sf remains unchanged at least until the subsequent read clock pulse Sd occurs. In this way, the processed data signal Sb is sampled and is transformed into a second processed data signal Sf free from jitters and high frequency noises. The second processed data signal Sf has a fixed time delay or phase difference with respect to the original data signal Sa. Even when the processed data signal Sf deviates from its normal time delay with respect to the original data signal Sa, the waveform of the processed data signal Sf is essentially the same as the waveform of the true data components of the original data signal Sa.

In summary, the original data signal Sa is waveshaped into a delayed data signal Sf through a first sampling process in the phototransistor 3b of the photocoupler 3 and through a second sampling process in the D flip-flop 13. Even if the original data signal Sa has ripple, jitter and noise components, the wave-shaping process substantially eliminates the ripple, jitter and noise components so that a clean data signal Sf is available. Accordingly, both the previously-mentioned causes (1) and (2) of the signal deterioration are removed in the interface circuit of this embodiment. In cases where the interface circuit of this embodiment is applied to digital audio or video systems, the removal of the previously-mentioned causes (1) and (2) of the signal deterioration ensures excellent fidelity in sound or image reproduction.

It should be noted that each of the photocouplers 3 and 11 may be replaced with a photointerrupter, or a combination of a light emitting element, a light sensitive element, and an optical fiber connecting these elements. Furthermore, the transmission circuit 20 and the reception circuit 21 may be coupled via electromagnetic couplings including transformers in place of the optical connections including the photocouplers 3 and 11.

The digital signal control circuit 6 may consist of any devices or apparatuses which output a digital data signal and a sync signal. For example, the digital signal control circuit 6 consists of a video tape recorder (VTR), a PCM recorder, a compact disc (CD) player, or a digital audio tape recorder (DAT).

Figure 4:
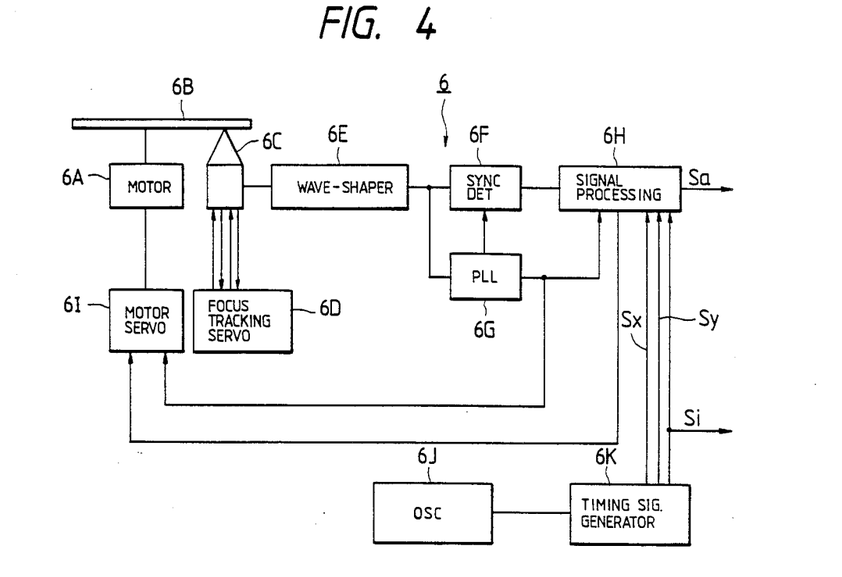
FIG. 4 is a block diagram of an example of the digital signal control circuit of FIG. 1.

FIG. 4 shows an example of the digital signal control circuit 6 which is composed of a CD player. As shown in FIG. 4, the digital signal control circuit 6 includes a spindle motor 6A rotating a compact disc 6B. An optical pickup 6C derives a reproduced data signal from the compact disc 6B. The optical pickup 6C is controlled by focus servo and tracking servo systems 6D. After being processed by an analog wave shaper 6E, the data signal is applied to a synchronous detector 6F and a phase-locked loop (PLL) circuit 6G. The PLL circuit 6G regenerates clocks from the data signal. These clocks are applied to the synchronous detector 6F and a digital signal processing unit 6H. After built-in sync signals are detected from the data signal by the device 6F, the data signal is processed in the device 6H to form a digital data signal Sa. The clocks from the PLL circuit 6G are applied to a motor drive servo system 6I. The digital signal processing unit 6H outputs a motor control signal to the motor drive servo system 6I. The motor drive servo system 6I controls the spindle motor 6A in accordance with the motor control signal and the clocks. The digital signal control circuit 6 also includes an oscillator 6J outputting a basic clock signal having a frequency of 12.348 MHz. The basic clock signal is applied to a timing control signal generator 6K. The device 6K generates master clocks Sx, transmission digital signal serial clocks Sy, and sync clocks Si on the basis of the output signal from the oscillator 6J. The clocks Sx, Sy, and Si are applied to the digital signal processing unit 6H. In addition, the sync signal Si is applied to the driver 10 (see FIG. 1). The master clocks Sx have a frequency of 3.087 MHz. The transmission digital signal serial clocks Sy have a frequency of 1.5435 MHz. The sync clocks Si have a frequency of 44.1 KHz. The digital signal processing unit 6H sequentially outputs bits of the digital data signal Sa in synchronism with the transmission digital signal serial clocks Sy. In addition, as shown in FIG. 3, one each series of data in the signal Sa is outputted in synchronism with each sync pulse Si.

Figure 5:
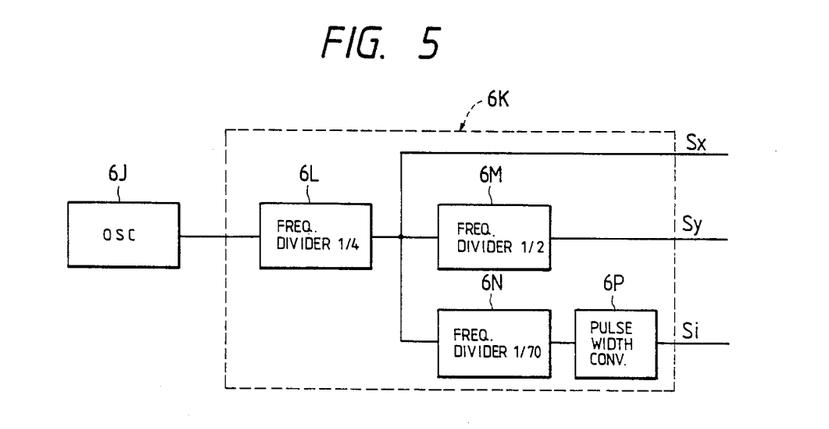
FIG. 5 is a block diagram of the timing control signal generator of FIG. 4.

As shown in FIG. 5, the timing control signal generator 6K includes frequency dividers 6L, 6M, and 6N, and a pulse-width converter 6P such as a monostable multivibrator. The frequency divider 6L generates the 3.087-MHz master clocks Sx on the basis of the 12.348-MHz clock signal from the oscillator 6J through a ¼ frequency dividing process. The frequency divider 6M generates the 1.5435-MHz transmission digital signal serial clocks Sy on the basis of the 3.087-MHz signal from the frequency divider 6L through a ½ frequency dividing process. The combination of the frequency divider 6N and the pulse-width converter 6P generates the 44.1-KHz sync clocks Si on the basis of the 3.087-MHz signal from the frequency divider 6L through a 1/70 frequency dividing process.

Figure 6:
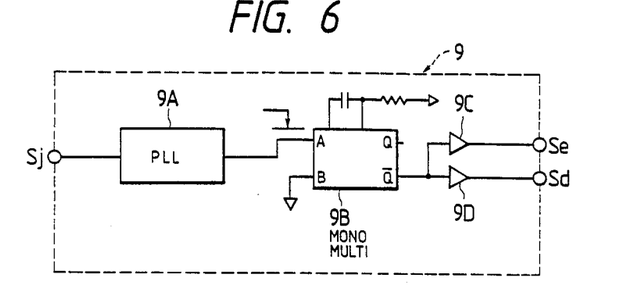
FIG. 6 is a block diagram of the timing control signal generator of FIG. 1.

FIG. 6 shows an example of the timing control signal generator 9. As shown in FIG. 6, the timing control signal generator includes a PLL circuit 9A, a monostable multivibrator 9B, and buffers 9C and 9D. The PLL circuit 9A generates a 1.5435-MHz signal on the basis of the 44.1-KHz sync signal Sj with a predetermined delay time or phase relation therewith through a frequency multiplication process. The monostable multivibrator 9B converts the output signal from the PLL circuit 9A into the short-pulse driver control signal Se having a predetermined pulse duration and the short-pulse read clock signal Sd which are transmitted via the buffers 9C and 9D respectively. For example, the pulse width of the driver control pulses Se and the read clocks Sd is about 50 nanoseconds. The time constant of the PLL circuit 9A is chosen so that the PLL circuit 9A will not respond to jitter components of the sync signal Sj. Accordingly, the driver control signal Se and the read clock signal Sd are free from the jitters.

As understood from the previous description, the frequency divider 6N of the digital signal control circuit 6 within the transmission circuit 20 down-converts the 1.5435-MHz transmission digital signal serial clocks Sx and thereby derives the 44.1-KHz sync signal Si. The sync signal Si is transmitted from the transmission circuit 20 to the reception circuit 21 via the photocoupler 11. The second 44.1-KHz sync signal Sj corresponding to the original sync signal Si is up-converted by the PLL circuit 9A of the timing control signal generator 9 within the reception circuit 21, forming the 1.5435-MHz sampling control signals Se and Sd having the same frequency as the transmission digital signal serial clocks Sx. Accordingly, the frequency of the transmitted sync signal Si is much lower than the bit transmission frequency of the digital data signal Sa. This frequency choice of the transmitted sync signal Si is advantageous becuase of the following fact. If the frequency of a transmitted sync signal was equal to the bit transmission frequency of a digital data signal, and the transmitted sync signal was directly used in the sampling of the transmitted digital data signal, jitter and noise components of the transmitted sync signal would directly interfere with the sampled digital data signal.

DESCRIPTION OF THE SECOND PREFERRED EMBODIMENT

Figure 7:
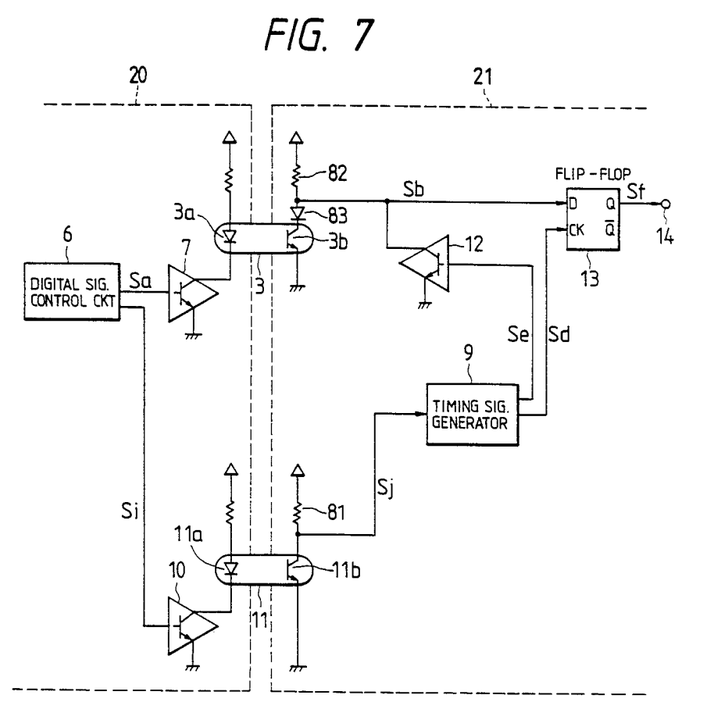
FIG. 7 is a diagram of an interface circuit according to a second embodiment of this invention.

FIG. 7 shows a second embodiment of this invention, which is similar to the embodiment of FIGS. 1-6 except for the following design changes.

Figure 8:
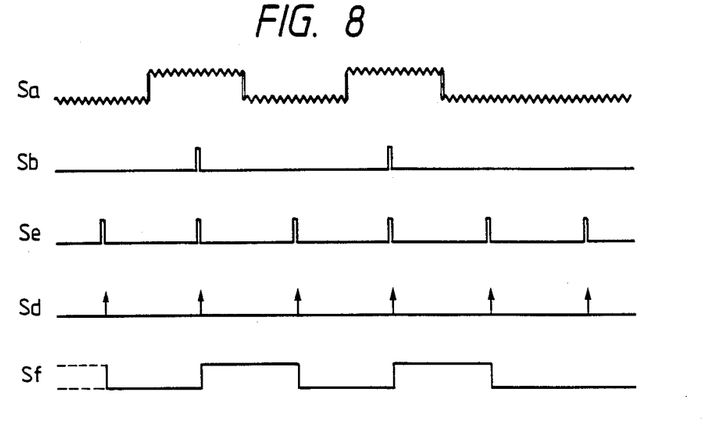
FIG. 8 is a timing diagram of waveforms of various signals developed in the interface circuit of FIG. 7.

As shown in FIG. 7, the phototransistor 3b of the photocoupler 3 is connected to a constant voltage source (not shown) via a diode 83 and the fixed resistor 82. The output terminal of the driver 12 is connected to the phototransistor 3b across the diode 83. The timing control signal generator 9 outputs a control signal Se to the input terminal of the driver 12. As shown in FIG. 8, the driver control signal Se contains positive or non-inverted pulses having a predetermined timing relationship with the transmitted digital data signal Sa. The driver 12 is made conductive and nonconductive in accordance with the control pulse signal Se. For example, the driver 12 is made conductive and nonconductive when a driver control pulse Se is absent and present respectively. The junction between the diode 83 and the fixed resistor 82 is connected to the data input terminal of the D flip-flop 13.

In cases where the driver 12 is made nonconductive by the control signal Se, while the LED 3a of the photocoupler 3 emits light, the phototransistor 3b is made conductive so that a current flows through the fixed resistor 82, the diode 83, and the phototransistor 3b. In the same cases, when the light emission from LED 3a is interrupted, the current flow through the elements 3b, 82, and 83 is inhibited. Accordingly, in cases only when the driver 12 is nonconductive, a potential Sb at the junction between the diode 83 and the fixed resistor 82 essentially represents two different levels thereat caused by the allowance and inhibition of the light emission from the LED 3a so that the potential Sb reflects the digital data signal Sa as shown in FIG. 8. In other words, the digital data signal Sa from the transmission unit 20 is transmitted to the reception unit 21 in the form of a digital signal Sb. The diode 83 is provided for the purpose of preventing the phottansistor 3b from errornious operation when the diode 12 bcomes conductive.

In cases where the driver 12 is made conductive by the control signal Sc, the digital signal Sb remains in the lower level state irrespective of the digital data signal Sa.

The relative timings of the control pulses Se and the read clock pulses Sd are chosen so that the D flip-flop 13 samples the digital signal Sb at moments which reside outside periods during which the signal Sb is forcedly held at the lower level state by the driver 12.

DESCRIPTION OF THE THIRD PREFERRED EMBODIMENT

Figure 9:
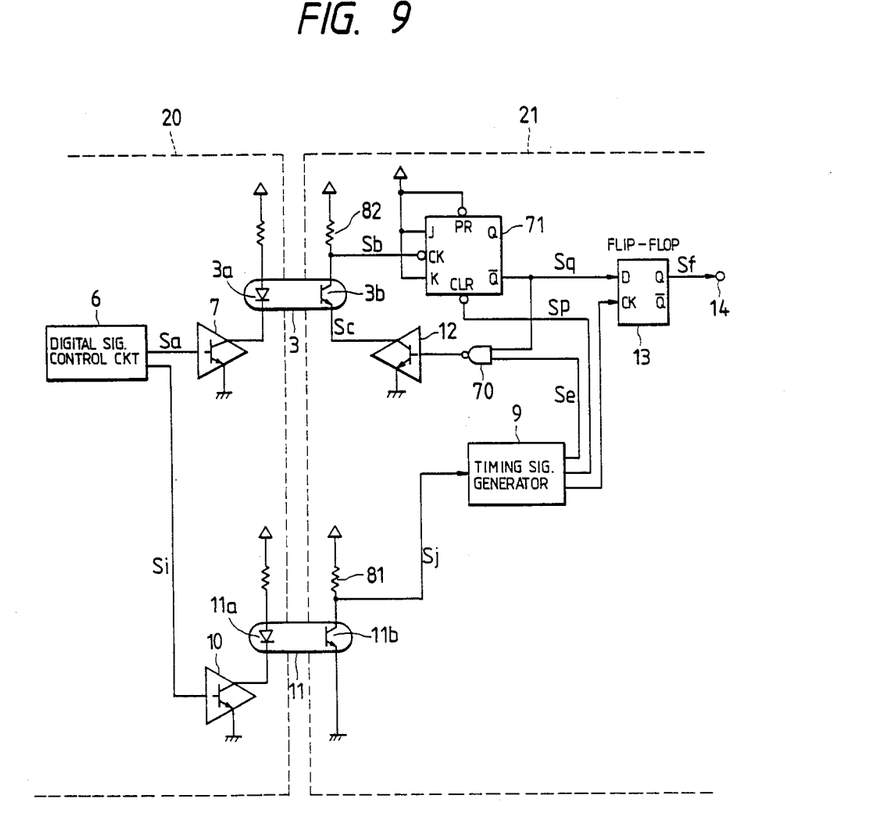
FIG. 9 is a block diagram of an interface circuit according to a third embodiment of this invention.

FIG. 9 shows a third embodiment of this invention, which is similar to the embodiment of FIGS. 1-6 except for the following design changes.

As shown in FIG. 9, the reception circuit 21 includes a NAND gate 70 and a J-K flip-flop 71. An output terminal of the timing control signal generator 9 is connected to a first input terminal of the NAND gate 70 so that the driver control signal Se is applied to the first input terminal of the NAND gate 70. An output terminal of the NAND gate 70 is connected to the input terminal of the driver 12 so that an output signal from the NAND gate 70 is applied to the driver 12. The timing control signal generator 9 derives a pulse signal Sp from the transmitted sync signal Sj. For this purpose, the timing control signal generator 9 includes a delay circuit (not shown) which derives the pulse signal Sp from the driver control signal Se with a time delay. An output terminal of the timing control signal generator 9 is connected to a clear terminal of the J-K flip-flop 71 so as to supply the pulse signal Sp to the J-K flip-flop 71.

Figure 10:
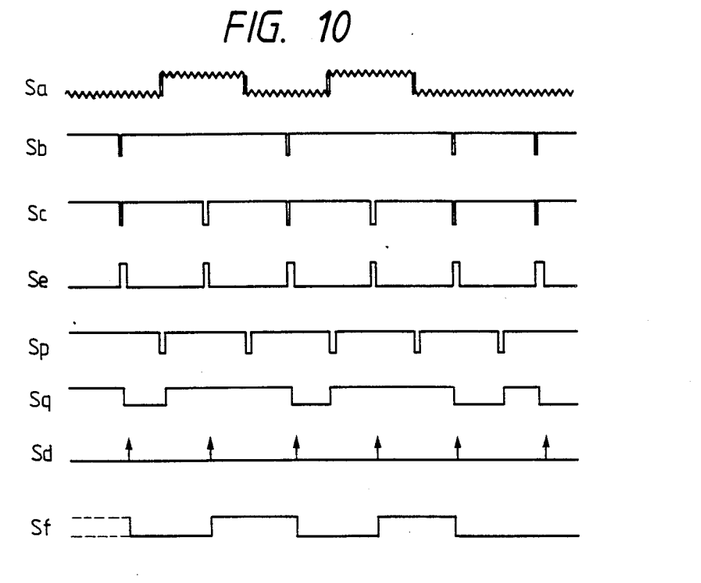
FIG. 10 is a timing diagram of waveforms of various signals developed in the interface circuit of FIG. 9.

As shown in FIG. 10, the signal Sp contains pulses having a fixed timing relationship with the transmitted digital data signal Sa. The frequency of the pulses Sp is the same as the frequency of the driver control pulses Se. However, the timing of the occurrence of these pulses Sp differs from the timing of the occurrence of the driver control pulses Se.

The junction between the fixed resistor 82 and the phototransistor 3b is connected to a clock input terminal of the J-K flip-flop 71 so that the signal Sb is applied to the J-K flip-flop 71. An inverting output terminal of the J-K flip-flop 71 is connected to the data input terminal of the D flip-flop 13 and a second input terminal of the NAND gate 70 so that an output signal Sq from the J-K flip-flop 71 is applied to the D flip-flop 13 and the NAND gate 70. A J-terminal and a K-terminal of the J-K flip-flop 71 are subjected to a positive constant voltage.

As shown in FIG. 10, when a pulse Sp is applied to the clear terminal of the J-K flip-flop 71, the output signal Sq from the J-K flip-flop 71 changes to or remains at a logic state "1" (HIGH). This logic "1" signal Sq is applied to the NAND gate 70. Then, a driver control pulse Se is applied "HIGH" to the NAND gate 70, this causes the output signal from the NAND gate 70 "LOW" and thereby making the driver 12 conductive.

In cases where no current flows through the LED 3a, the signal Sb remains in a logic state "1" (HIGH) irrespective of the change of the state of the driver 12, since the phototransistor 3b remains nonconductive.

In cases where a current flows through the LED 3a, when the driver 12 becomes conductive, the signal Sb changes to a logic state "0" (LOW). This logic "0" signal Sb changes the flip-flop output signal Sq to a logic state "0", thereby changing the output signal of the NAND gate 70 to a logic state "1" (HIGH) and making the driver 12 nonconductive. Thus, the driver 12 becomes conductive for only a short period. This is advantageous in removing unwanted components from the digital data signal transmitted between the transmission circuit 20 and the reception circuit 21.

DESCRIPTION OF THE FOURTH PREFERRED EMBODIMENT

Figure 11:
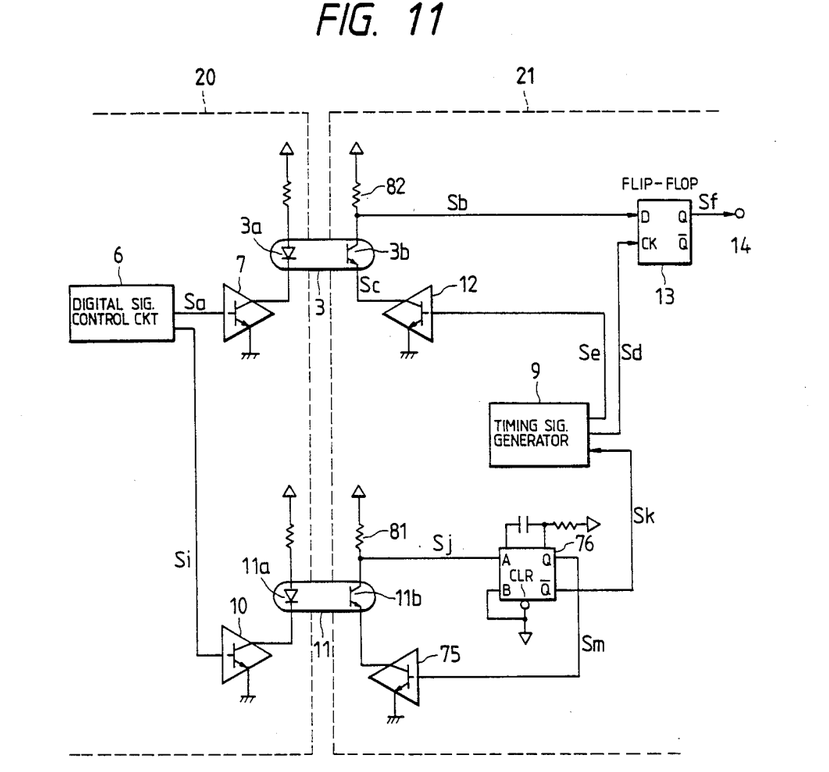
FIG. 11 is a block diagram of an interface circuit according to a fourth embodiment of this invention.

FIG. 11 shows a fourth embodiment of this invention, which is similar to the embodiment of FIGS. 1-6 except for the following design changes.

As shown in FIG. 11, the reception circuit 21 includes a driver 75 which may be the type SN7407 device mentioned before and a monostable multivibrator 76. An output terminal of the driver 75 is connected to the constant voltage source (not shown) via the phototransistor 11b of the photocoupler 11 and the fixed resistor 81. The driver 75 is changeable between a conductive state and a nonconductive state. When the driver 75 is nonconductive, the current flow through the phototransistor 11b of the photocoupler 11 is continuously inhibited so that the sync signal Sj remains at a high level state irrespective of the original sync signal Si. When the drive 75 is conductive, the current flow through the phototransistor 11b of the photocoupler 11 is allowed in response to the original sync signal Si so that the sync signal Sj varies in accordance with the original sync signal Si as far as the driver 75 remains conductive. In this way, the phototransistor 11b of the photocoupler 11 is enabled and disabled when the driver 75 is conductive and nonconductive respectively.

An input terminal of the driver 75 is connected to a non-inverting output terminal of the monostable multivibrator 76 so that the driver 75 receives a binary output signal Sm from the monostable multivibrator 76. The driver 75 preferably includes a switching transistor which is made conductive and nonconductive in accordance with change of the binary control signal Sm between two different level states. For example, the drive 75 is made conductive and nonconductive when the control signal Sm assumes a logic state "0" and a logic state "1" respectively. An input terminal of the monostable multivibrator 76 is connected to the junction between the fixed resistor 81 and the phototransistor 11b of the photocoupler 11 so that the monostable multivibrator 76 receives the sync signal Sj. The monostable multivibrator 76 generates the driver control pulses Sm in response to the input sync pulses Sj.

Figure 12:
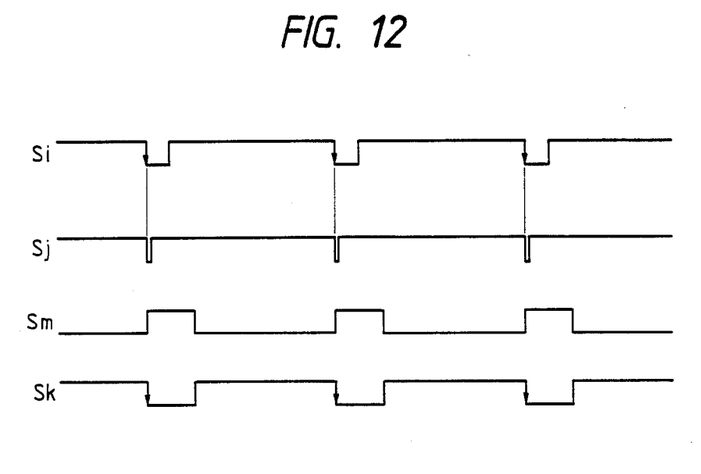
FIG. 12 is a timing diagram of waveforms of various signals developed in the interface circuit of FIG. 11.

The driver 75 is normally conductive when no signal (logic 0 is inputted so that the phototransistor 11b of the photocoupler 11 is normally enabled. As shown in FIG. 12, when the original sync signal Si goes low, the sync signal Sj changes to a low level state. The change of the sync signal Sj to the low level state triggers the monostable multivibrator 76 so that the monostable multivibrator 76 outputs a positive pulse Sm. The positive pulse Sm forces the driver 75 to be nonconductive, thereby disabling the phototransistor 11b of the photocoupler 11 and causes the level of the sync signal Sj returning to a high level state. Accordingly, shortly after the level of the sync signal Sj changes to the low level state in response to the original sync signal Si, the sync signal Sj returns to the high level state. As shown in FIG. 12, each driver control pulse Sm maintains its "HIGH" level longer than a pulse duration of the related sync pulse Si. In this way, the periods during which the phototransistor 11b of the photocoupler 11 remains enabled are limited. In addition, the duration of the sync pulses Sj is limited to a short period. These limiting processes are advantageous in removing unwanted noise, ripple and jitter components from the transmitted sync signal.

An inverting output terminal of the monostable multivibrator 76 is connected to the input terminal of the timing control signal generator 9 so that a sync signal Sk is applied to the timing control signal generator 9. As shown in FIG. 12, the sync signal Sk is an inversion of the driver control signal Sm.

What is claimed is:

1. An interface circuit for transmitting a digital data signal from a transmission unit to a reception unit, the interface circuit comprising:
    (a) a photo coupling means optically connecting the transmission unit and the reception unit, the photo coupling means including a photo emitter and a photo receptor connected via an optical path, the photo emitter being disposed in the transmission unit and provided with the transmission digital data signal, said photo emitter generating an optical signal corresponding to the transmission digital data signal, the photo receptor being disposed in the reception unit and receiving the optical signal, the photo receptor being switched by short electrical pulses, the photo receptor sampling the optical signal and converting the sampled optical signal into a corresponding reception digital signal at moments of occurrences of the short electrical pulses;
    (b) means for transmitting a sync signal from the transmission unit to the reception unit, the sync signal having a fixed timing relationship with the transmission digital data signal;
    (c) pulse generating means, disposed in the reception unit, for generating the short electrical pulses on the basis of the sync signal and for synchronizing the short electrical pulses with the transmission digital data signal, and
    (d) sync generating means disposed in the transmission unit for generating said sync signal, and a second photo coupling means optically connecting the transmission unit and the reception unit for transmitting said sync signal from the transmission unit to the reception unit.

2. The interface circuit of claim 1 further comprising switching means, connected in series with the photo receptor, for cutting off a current through the photo receptor in response to the occurrences of the short electrical pulses.

3. The interface circuit of claim 1 further comprising switching means, connected in parallel with the photo receptor, for normally shunting an output of the photo receptor to a ground and for removing said shunting in response to pulse occurrences.

4. The interface circuit of claim 1 wherein said pulse generating means in said reception unit comprises phase lock loop means responsive to said sync signal for generating a first signal having a predetermined frequency and a predetermined phase relation with respect to said sync signal and monostable multivibrating means for converting said first signal to said short electrical pulses.

5. The interface circuit of claim 1 the second photo coupling means comprises a photo emitter disposed in the transmission unit and a photo receptor disposed in the reception unit.

6. The interface circuit of claim 4 wherein said monostable multivibrating means further provides a short pulse output signal for triggering a flip flop circuit of said reception circuit to read said reception digital signal received from said transmission circuit.

7. The interface circuit of claim 1 wherein said sync generating means comprises a sync driver in said transmission unit for causing a light emitting means of said second photo coupling means to emit light pulses optically representing said sync signal, said light emitting means located in said transmission unit.

8. The interface circuit of claim 7 wherein said sync driver is connected to respond to binary sync pulses generated by a digital signal control circuit generating said transmission digital data signal.

9. The interface circuit of claim 8 wherein said sync driver operates to cause said light emitting means of said second photo coupling means to emit said optical sync signal at a frequency much lower than a bit transmission frequency of said transmission digital data signal, thereby reducing interference between jitter and noise components of the sync signal and the transmission digital data signal.

10. The interface circuit of claim 8 wherein said digital signal control circuit includes timing signal generator means for generating a master clock signal, a transmission digital signal clock, and said binary sync pulses.

11. The interface circuit of claim 10 wherein said timing signal generator means is connected to receive a signal from an oscillator, said signal having a first frequency, said timing signal generator means comprising a plurality of frequency dividing means and pulse width converting means for generating said master clock signal, said transmission digital signal clock, and said binary sync pulses.

12. The interface circuit of claim 1, further comprising a pulse width extending circuit for limiting a duration of pulses in said sync signal, said pulse width extending circuit including driver means in said reception circuit for enabling and disabling a photo receptor of said second photocoupling means to provide sync pulses in response to said sync signal, and a monostable multivibrator responsive to said sync pulses for outputting a binary control signal to said driver means after a predetermined delay relative to said sync pulses.

13. An interface circuit for transmitting a digital data signal from a transmission unit to a reception unit, the interface circuit comprising:
   (a) a photo coupling means optically connecting the transmission unit and the reception unit, the photo coupling means including a photo emitter and a photo receptor connected via an optical path, the photo emitter being disposed in the transmission unit, the photo emitter being supplied with the transmission digital data signal and generating an optical signal corresponding to the transmission digital data signal, the photo receptor being disposed in the reception unit and receiving the optical signal, the photo receptor being switched by short electrical pulses, thereby the photo receptor sampling the optical signal and converting the sampled optical signal into a corresponding digital signal at moments of occurrences of the short electrical pulses;
   (b) means, disposed in the transmission unit, for generating a sync signal having a fixed timing relationship with the transmission digital data signal and having a frequency lower than a bit transmission frequency of the transmission digital data signal;
   (c) means for transmitting the sync signal from the transmission unit to the reception unit;
   (d) means, disposed in the reception unit, for generating timing control pulses on the basis of the sync signal through a frequency multiplication process, the timing control pulses being synchronous with the transmission digital data signal and having a frequency equal to the bit transmission frequency of the transmission digital data signal; and
   (e) means, disposed in the reception unit, for generating the short electrical pulses in synchronism with the timing control pulses.

14. An interface circuit for transmitting a digital data signal from a transmission unit to a reception unit, the interface circuit comprising:
   (a) photo coupling means optically connecting the transmission unit and the reception unit, the photo coupling means including a photo emitter and a photo receptor connected via an optical path, the photo emitter being disposed in the transmission unit and provided with a transmission digital data signal, said photo emitter generating an optical signal corresponding to the transmission digital data signal, the photo receptor disposed in the reception unit and receiving the optical signal, the photo receptor converting the optical signal into a corresponding reception digital signal; and
   (b) means for preventing the reception digital signal from being contaminated by jitter components and high frequency noise components;
   the preventing means comprising pulse generating means in said transmission unit for generating short pulses in synchronism with a transmission digital data signal, means for transmitting the short pulses to said reception unit, and means in said reception unit for enabling the receptor with the short pulses, wherein the receptor samples the optical signal and converts the sampled optical signal into the reception digital signal in response to said short pulses.

* * * * *